Patented Aug. 18, 1925.

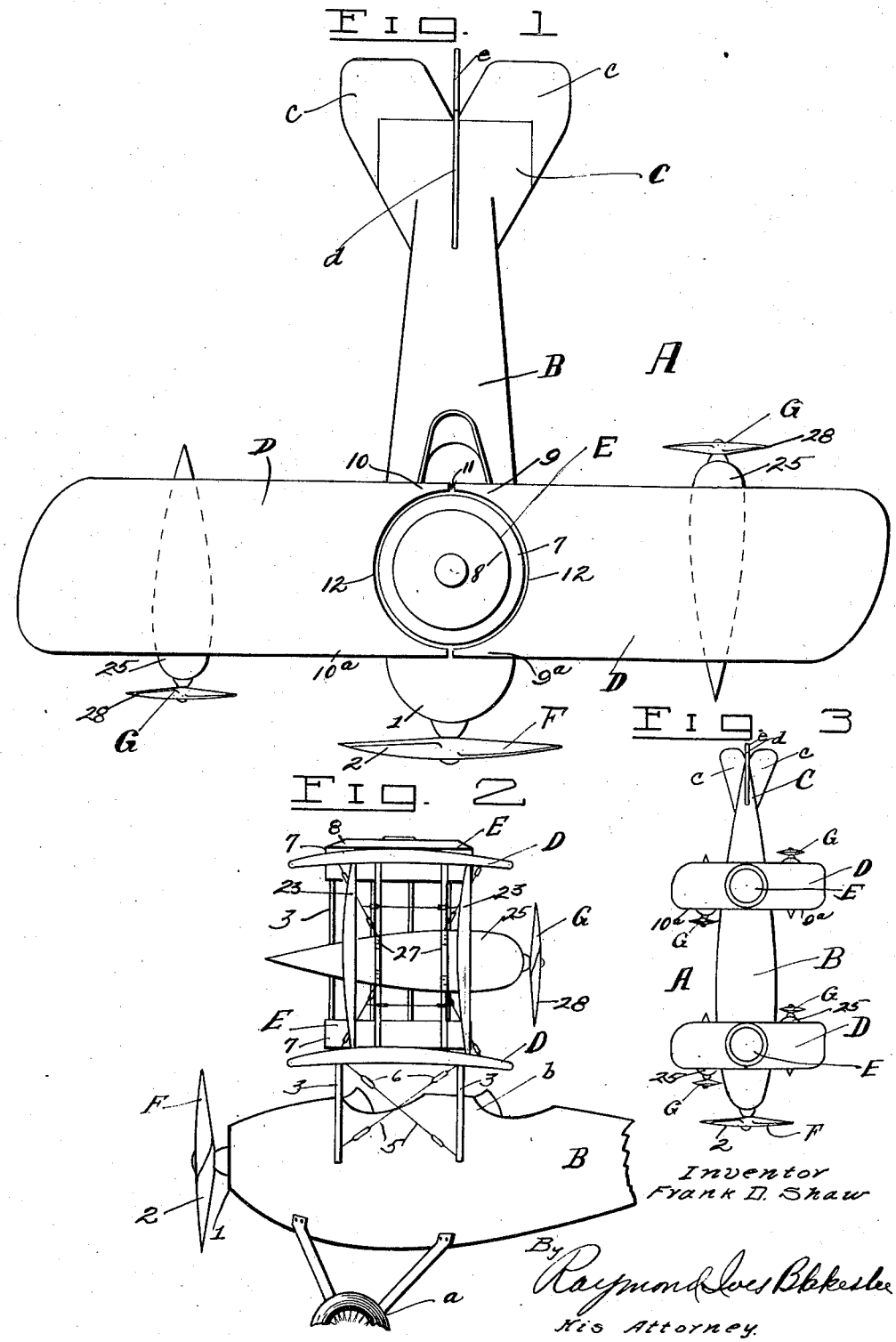

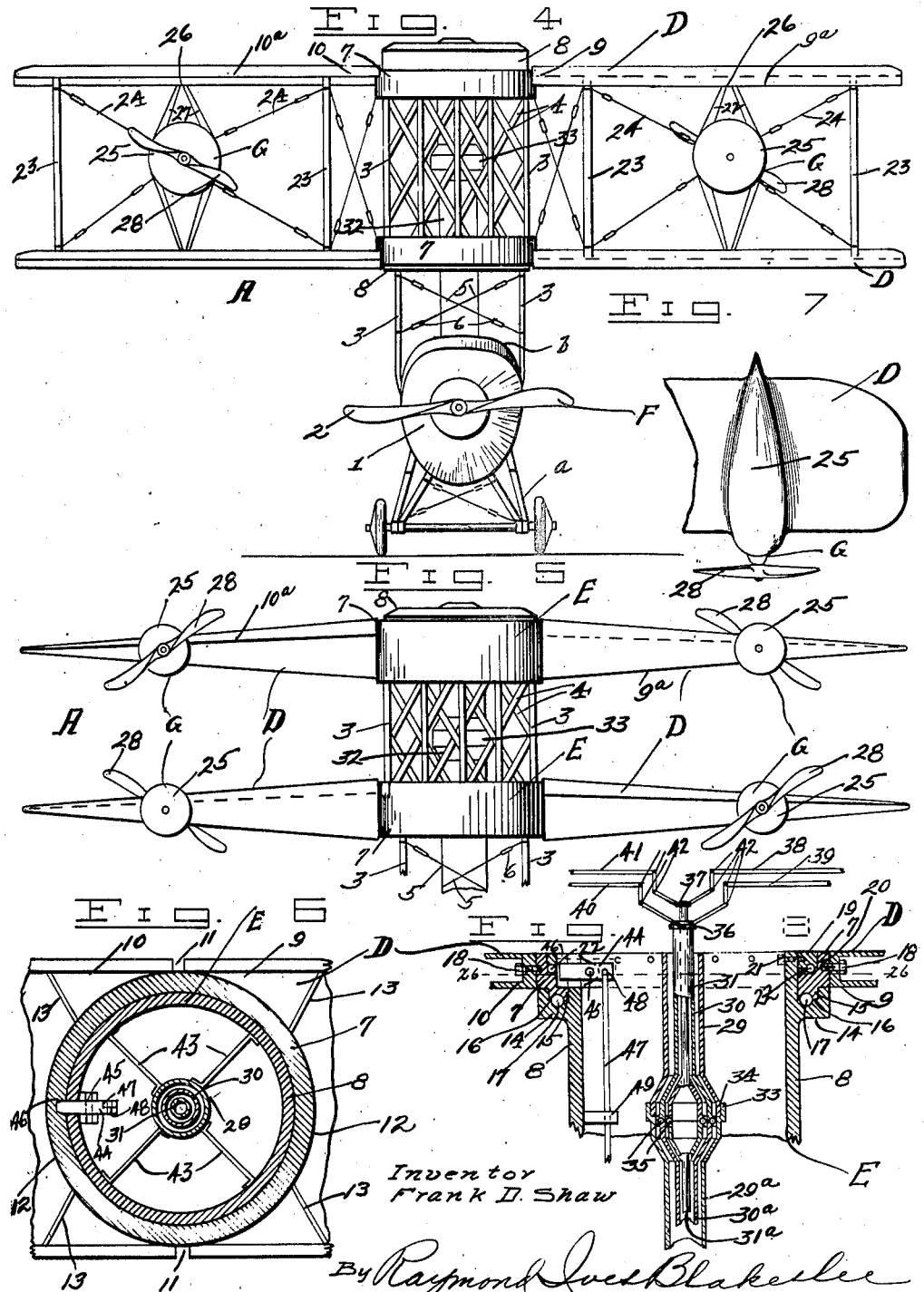

1,550,106

UNITED STATES PATENT OFFICE.

FRANK D. SHAW, OF SANTA ANA, CALIFORNIA, ASSIGNOR OF ONE-HALF TO PHILANDER H. ADAMS, OF SANTA ANA, CALIFORNIA.

FLYING MACHINE.

Application filed August 24, 1920. Serial No. 405,623.

*To all whom it may concern:*

Be it known that I, FRANK D. SHAW, a citizen of the United States, residing at Santa Ana, in the county of Orange and State of California, have invented new and useful Improvements in Flying Machines, of which the following is a specification.

This invention relates to heavier-than-air flying machines, and particularly to that type of flying machine or air vehicle which combines a helicopter with the generally accepted form of airplane now universally used. The invention has for an object the provision of a flying machine which may rise vertically from a fixed spot, hover in the air if desired, fly forwardly if desired, and in case of failure of the prime movers to operate, safely return to the earth without any fear of a vertical drop, and at a slow landing speed.

I obtain the above objects referred to by combining in a standard form of airplane built according to generally accepted and sound aeronautical principles, means whereby the main supporting surface may be rotated about a fixed axis associated with the fuselage of said plane. Means are likewise provided whereby the rotation of said plane may be prevented and the plane arranged so that the fuselage of the airplane is transverse to the main plane so that in case of engine failure the plane may act like airplanes now employed and successfully glide to the earth.

As this invention combines both the ordinary form of airplane and a helicopter, in referring to the vehicle in the specification, I shall call the same a helicoplane, as I believe this word aptly conveys an idea of the general function of the machine. Obviously a machine of this kind has many advantages from a practical standpoint, as for instance, slow landing; rising or returning to earth to a space scarcely larger than itself; proceeding in a forward direction at variable speeds; or poising in the air at any given altitude or over any given spot. It will thus be seen that a machine of this type would be particularly useful in war times and would practically supersede the now extensively used observation balloon. A machine of this type in war time would be advantageous, as its visibility would be far less than that of the form of observation balloon or airplane. The revolving wings of the machine would be a difficult target for the enemy gunners to hit and the machine might be constructed entirely of metal so that the operator of said machine would be protected. The chief fault with the average form of helicopter has been that in case the prime movers should stop their rotation suddenly, there would be little to sustain the helicopter in the air, with a consequent smash and perhaps death to the operator. The flying machine about to be described has circumnavigated the ordinary faults and disadvantages of the helicopter, by reforming an ordinary type of airplane so that the main supporting surfaces or wings thereof may revolve. Obviously if the supporting surfaces are of sufficient size the airplane would glide or readily move forward similar to the ordinary type of airplane now employed, and danger from a smash-up of course would be prevented. It is a recognized fact that very little is known at the present time about the average screw propeller, and history reveals that almost all attempts to rise vertically in the air and hover over a given spot have been made by placing some form of screw propeller upon a rotating shaft attached to an engine. However, a propeller rotating at a high speed, as tests have revealed, scarcely ever produces a thrust greater than 12 pounds of lift per horse power. It is true that one form of propeller now on the market gives an effective lift of 20 pounds per horse power. However, the latter is the exception rather than the rule. The general argument for this machine is that by rotating the main supporting surfaces slippage is reduced. Furthermore, if the wings are already constructed so that they will lift the plane similar to an ordinary airplane then by rotating the wings it is thought that the airplane should rise vertically as the lift would be the same.

To rotate the wings I provide engines enclosed in a stream line housing or nacelle placed toward the wing tips. Most experimenters along helicopter lines have attempted to rotate the bladed elements from a central shaft connected to the hubs of said bladed elements. The analogy between attempting to rotate a large wheel from the center and then attempting to rotate the same by force applied to the periphery of said wheel, leads at once to certain conclusions, viz, that it is almost impossible to rotate a large object from the center, but that when force is applied to the periphery or outer edge of the object away from the center of said object, it is easily moved, due to the difference in leverage. For this reason I have placed the prime movers near the wing tips, so that the wings may revolve easily and at any speed desired by the operator. It is immediately obvious that an attempt to rotate an airplane's wings or supporting surfaces from the center, would almost be an impossibility, but by arranging the prime movers as just stated, this difficulty immediately becomes easy of solution.

The invention for further objects has the provision of an improved flying machine which will be superior in point of relative simplicity and inexpensiveness, taken in conjunction with utility, durability and general efficiency and serviceability.

With the above and other objects in view, the invention consists in the novel and useful provision, formation, construction, combination, association and inter-relation of parts, members and features, all as disclosed in the accompanying drawing, described in the following statement and finally pointed out in claims.

In the drawings:

Figure 1 is a top plan view of an airplane utilizing the invention;

Figure 2 is a fragmentary side elevation of the machine shown in Figure 1;

Figure 3 is a view similar to Figure 1, with the exception that the main supporting surfaces are arranged in tandem form;

Figure 4 is a front elevation of the machine shown in Figure 1;

Figure 5 is a fragmentary modification of the device shown in Figure 4, showing internally braced supporting surfaces with propulsive means mounted upon said surfaces;

Figure 6 is a cross sectional view of certain features of the invention and taken on the line $x^6$—$x^6$, Figure 8;

Figure 7 is a fragmentary top plan view of the propulsive element with its housing integrally formed with one of the main planes of the form of plane shown in Figure 5; and, Figure 8 is a cross sectional view of the controlling means for said machine.

Corresponding parts in all the figures are designated by the same reference characters.

Referring with particularity to the drawings, A represents the complete flying machine of which B is the fuselage; C designates the empennage, D the main supporting elements or plane, and E a revolving turret associated with the supporting elements D. F designates means for causing the flying machine to move in a forward direction, and G means for causing the lifting planes D to rotate,—all of which elements are used in practicing one embodiment of the invention.

The fuselage B is provided with the usual landing chassis $a$ which landing chassis may have wheeled elements associated therewith so that the plane may land upon the ground or may have pontoons so that the plane may alight upon water. No particular form of chassis $a$ is intended to be represented, as the drawing is illustrated only of one form that might be readily utilized. The fuselage B may be suitably stream lined and may be of the monocoque construction. The nacelle $b$ may accommodate many passengers if desired, and may be made in cabin form, depending of course upon the use to which the helicoplane may be put. The empennage C associated with the fuselage B is provided with elevators $c$ of the balanced type, and the elevators $c$ are so arranged that they may be operated by the pilot in opposite directions, that is to say, one elevator tipped upwardly, and one downwardly, so that the lateral balance of the plane A may be maintained when the plane is moving in a forwardly direction; or the elevators $c$ may be operated so that they both move synchronously upwardly or downwardly to provide for elevating the plane or causing it to descend. An ordinary form of fin $d$ and rudder $e$ are likewise provided. To maintain the forward direction of the flying machine an engine is enclosed in the nose 1 of the fuselage B and a tractor propeller 2 is attached to the shaft of the engine.

In that form of flying machine illustrated in Figures 1, 2 and 4, I provide the generally accepted bi-plane wing formation mounted above the fuselage B. To accomplish this the wings D are mounted upon a revolving turret E, which turret is arranged intermediate the wing spread. The turret E is shown in the figures as having pillars or struts 3 rising from the sides of the fuselage. The pillars or struts 3 are suitably braced to resist stresses by truss members 4, where the turret combines with the wings D. Below the wing members D the struts 3 are braced by means of guys 5 provided with turn-buckles 6. Surrounding that portion of the turret E associated between the bi-plane wing formation are annular or ring-like members 7 and 8. The ring-like members 7 have the wing members D joined to the same, and rotate with the wing members. The members 8 do not rotate, nor do the struts 3 of the turret E rotate.

Referring to Figures 6 and 8 the wings D are associated at the turret point so that the opposite sides of the wing formation D as 9 and 10 are divided at an intermediate point of the entire wing structure, as at 11. This is in order that one wing may be given a different angle of incidence from the other. As shown in Figures 1 and 4 it will be observed that that portion of the wing D as 10ª presents a leading edge, while the portion 9ª of the wing presents a trailing edge. This is in order that when the wings are rotating about the turret E a leading edge shall always be presented. Where the wing member D joins the turret the wing member is cut in the form of an arc as 12, as of course would be necessary in the construction shown. Suitable bracing means as 13 are associated with the wing member D and joined to the member 7.

Referring to Figure 8 a method of joining the wing members D to the member 7 is shown. 8 is the fixed part of the turret and 7 is the rotatable part and the wing member D is of course joined to the rotatable part. In order to obtain and allow rotation of the wing members the fixed portion 8 of the turret is provided with an annular outstanding and grooved portion 14. The rotatable portion of the turret 7 has a downwardly extending circumferential portion 15 fitting within the grooved portion 16 of the outstanding part 14. Anti-friction means as 17 are interposed between the race formed by the portion 15 and the groove 16. The wing members are fastened to the member 7 by suitable means as bolts or screws 18 which pass through the wing members and are embedded in the member 7. It is of course necessary to use some means so that the member 7 will remain in position when the wings commence to lift the flying machine, and this is accomplished by providing an annular member as 19 cooperating with an annular groove 20 located in the member 7. The member 19 is fastened to the fixed member 8 by means of screws or other retaining means 21. Anti-friction means 22 are interposed between the member 19 and the groove 20 of the member 7. Thus when the wings are revolving the ball bearing race between the fixed member 8 of the turret and the movable member 7 tends to prevent friction and at the same time allows the wing members to be retained in position with relation to the turret. The bottom portion of the turret is identical in formation with that just described. In actual practice the turret E does not have its upstanding pillars or struts exposed, as this would cause too great a drag or parasite resistance to the movement of the flying machine and the turret member 8 extends over the struts 3 of the same.

The bi-plane construction shown in Figures 2 and 4 needs little explanation, as it is standard practice. The bi-plane of course is provided with superimposed wing members D, and the struts 23 maintain the planes spaced from each other. Guy wires 24 add to the bracing of the wing truss structure. In order to propel the wings in their rotation about the turret E engines encased in suitable stream line nacelles 25 are arranged near the wing tips of the wings, as at 26. To support the nacelles 25 struts 27 are provided which aid in the general stress resistance of the wing truss. It has been explained in the earlier part of the specification that the propulsive elements to cause the rotation of the wing members is placed away from the axis of rotation of the wing members in order that while rotating the planes a leverage is interposed which easily rotates the planes. It was also pointed out that it would be practically impossible to rotate the wing members from an engine located in the fuselage by means of a rotating central shaft; but by arranging the propulsive elements located within the nacelles 25 and attaching ordinary form of tractor propellers 28 to the engine shafts, that rotation of the wings is easily accomplished. If desired, instead of arranging the diametrically opposite sides of the wing members so that each presents a different angle of incidence from the other, a parabolic wing structure such as that shown in Figure 2 might be readily utilized, in which case it is obvious that it would make little difference which direction the wings were rotated. Further than this, the parabolic wing structure gives one an easy method of locating the center of pressure which would be approximately 5/10 of the cord from the leading edge, and thus one would be able to definitely compute the center of gravity, the center of thrust, and the center of resistance, so that all components of force might be easily located. So little is known at the present time concerning a flying machine of this type that it is difficult to predict actual performance of this machine by working with known constants. It is obvious that when the wing structure rotates about the turret E that as the motors located in the nacelles 25 rotate, there is set up a form of gyroscopic action which provides for a maximum of inherent stability in the plane itself, for the reason that the axis of rotation of the motor is constantly changing its position. It is therefore obvious that a lateral stability is provided for. However, as an added precaution the stabilizing surfaces c were made so that one could present a negative angle of incidence while the other was presenting a positive angle, if desired. To control the prime movers I provide the means illustrated in Figures 6 and 8. Said means includes a plurality of concentric tubular members 29, 30 and 31 extending up through the turret E, as shown at 32, and which tubular members enter the pilot's cock pit. Obviously as the wing members D rotate, some means must be provided so that the prime movers or engines located in the nacelles 25 may be regulated as to the peripheral speed of the propeller members 28, and to do this it is necessary to so arrange the tubular members that a certain portion of the same may rotate with the wing members while another portion will remain still. Each of the tubular members 29, 30 and 31 is divided as at 33, and further tubular members as 29ª, 30ª and 31ª join with the tubular members 29, 30 and 31 at this point. The tubular members 29ª and 29 are locked together as at 34 and do not rotate, while the tubular members 30 and 30ª and 31 and 31ª have angularly directed end portions accommodating anti-friction means 35 between the same. Obviously the outstanding ends of the said tubular members where they join one another at the point 33 are annular in formation. Ends 36 and 37 of the tubular members 30 and 31 respectively have joined to them control means such as Boden cables 38, 39, 40 and 41, which cables pass around suitable means as 42. Thus an outward movement of the same would tend to relax the cables, producing another result. Of course the outward movement or the lowering of the tubular members is accomplished by having the tubular members 30ª and 31ª connected with suitable levers in the pilot's cock pit. Referring to Figure 6 it will be seen that the tubular member 29 as well as 29ª has radial bracing members 43 joined to the same and to the turret member 8.

If the motors located in the nacelles 25 should suddenly stop rotating, the flying machine might pancake to the earth, causing a crash. It might be that the wing members might rotate and screw their way through the air, but in case they do not, it is deemed advisable to provide some means so that the wing members may be locked in relation to the fuselage similar to that shown in Figures 1 and 4 when the wing members are not rotating. It will thus be seen that the flying machine will then act like an ordinary airplane and if the propulsive element located in the fuselage has not stopped rotating also, the flying machine may continue along its course or it may glide to the earth, as desired. To accomplish this result I provide a latch means 44 suitably pivoted to the fixed member 8, as at 45, and cooperating with a notched portion 46 in the member 7. The latch member 44 is controlled by means of a link 47 joined to the latch member 44 as at 48. The link 47 passes downward through guides 49 located in the turret member 8 into the pilot's cock pit and there is operated by the pilot so that the latch may either engage the notch or not, as desired. It may at first appear that if the wing members were rotating at all rapidly after the engine in the nacelles 25 had stopped, it would be advisable not to drop the latch member 44 into the notched portion 46, as it might shear the same. However, a little thought will show that this is impossible, and the only tendency would be to rotate the fuselage of the flying machine in the same direction as the wings are moving until such time as the drag created by the fuselage rotating in the air stopped the rotation of the entire flying machine. The modification of the flying machine shown in Figure 3 is identical in all respects with the flying machine just described, with the exception that two sets of wings are provided mounted in tandem formation. The modification shown in Figure 5 shows a wing structure which is internally braced; and it is intended that the upper and lower wing structure therein illustrated should rotate in opposite directions. By the wings rotating in opposite directions a stabilizing force is set up, but it has been found that even though the wing structures revolve in the same direction, that is, both the upper and lower wing members, the stabilizing members associated with the fuselage will tend to prevent rotation of the fuselage. The means of mounting the wing structures shown in Figure 5 to the turret E, is identical in formation with that formerly described. Figure 7 shows the nacelles 25 built in and forming an integral structure with the wing members. Obviously this method of constructing the nacelles would have its benefits in that it tends to reduce head resistance.

It is obvious that many changes and modifications may be made in practicing the invention, in its various uses and purposes to which it may be put, all within a fair interpretation of the invention, as pointed out in the appended claims.

Having thus disclosed my invention, I claim and desire to secure by Letters Patent:

1. A combined direct lift and transitional flight heavier-than-air vehicle, including a monocoque fuselage provided with stabilizing fins and control elements, superimposed rectangular supporting planes presenting a continuous surface from wing tip to wing tip mounted above the fuselage and near the nose thereof, engines provided with stream line housings carried by the wing truss near the wing tips of the supporting planes, propellers mounted on the shafts of said engines, said superimposed wing members being so mounted above the fuselage that the same may bodily rotate about a definite point above said fuselage; means likewise being provided associated with the engines for controlling the speed of rotation of said superimposed wing members.

2. A combined direct lift and transitional flight heavier-than-air vehicle, including a monocoque fuselage provided with stabilizing fins and control elements, superimposed rectangular supporting planes presenting a continuous surface from wing tip to wing tip mounted above the fuselage and near the nose thereof, engines provided with stream line housings carried by the wing truss near the wing tips of the supporting planes, propellers mounted on the shafts of said engines, said superimposed wing members being so mounted above the fuselage that the same may bodily rotate about a definite point above said fuselage; means likewise being provided associated with the engines for controlling the speed of rotation of said superimposed wing members; there being an engine mounted in the nose of the fuselage, and a propeller mounted on the shaft of said engine outward from the nose of said fuselage; means being provided controllable from the cock pit of said fuselage for preventing rotation of said superimposed wing members and for causing the engine in the nose of the fuselage to drive said flying machine in transitional flight.

3. In a flying machine, the combination, of a fuselage, a turret mounted upon said fuselage, a bi-plane wing formation rotatably carried by said turret and adapted to bodily rotate in a given direction about said turret, propulsive means in the inter-plane space between the wings of the bi-plane formation for effecting such rotation; and means for locking said bi-plane wing formation transversely of the fuselage.

In testimony whereof, I have signed my name to this specification.

FRANK D. SHAW.